United States Patent [19]
Dunbar

[11] Patent Number: 5,449,974
[45] Date of Patent: Sep. 12, 1995

[54] VEHICLE WINDSHIELD WIPER/LIGHTING ACTIVATION SYSTEM UTILIZING A TIMED DELAY STARTUP AND LIGHT RETENTION FEATURE

[76] Inventor: Roger S. Dunbar, 22 Rum Row, Hilton Head Island, S.C. 29928

[21] Appl. No.: 121,276

[22] Filed: Sep. 13, 1993

[51] Int. Cl.$^6$ ............................................ B60Q 1/02
[52] U.S. Cl. ............................................ 315/82; 315/77
[58] Field of Search .................. 315/82, 83, 159, 360, 315/77; 307/10.8

[56] References Cited

U.S. PATENT DOCUMENTS

| | | | |
|---|---|---|---|
| 3,591,845 | 7/1971 | Vanderpoel et al. | 315/82 |
| 3,600,396 | 8/1971 | Aloisantoni | 315/82 |
| 3,628,085 | 12/1971 | Brock | 315/82 |
| 4,097,839 | 6/1978 | Lesiak | 315/82 |
| 4,656,363 | 4/1987 | Carter et al. | 315/82 |
| 4,665,321 | 5/1987 | Chang et al. | 315/82 |
| 4,956,562 | 9/1990 | Benedict et al. | 315/82 |
| 4,985,660 | 1/1991 | Cronk | 315/82 |
| 5,027,001 | 6/1991 | Torbert | 313/82 |
| 5,031,873 | 9/1991 | Ruter | 315/82 |
| 5,170,097 | 12/1992 | Montemurro | 315/83 |

Primary Examiner—Benny Lee
Assistant Examiner—Darius Gambino
Attorney, Agent, or Firm—Dewitt Ross & Stevens

[57] ABSTRACT

A combination windshield wiper/vehicle lighting system in which the head, tail and parking lights can be automatically activated when the windshield wipers are activated. A time-delay on device within the system causes the vehicle lights to be delay activated a short time after the windshield wipers are activated. Further, the present system includes the ability to retain the lights on once the windshield wipers have been deactivated. Ordinary function of the windshield wipers and vehicle lights is not impeded by the system of the present invention.

17 Claims, 1 Drawing Sheet

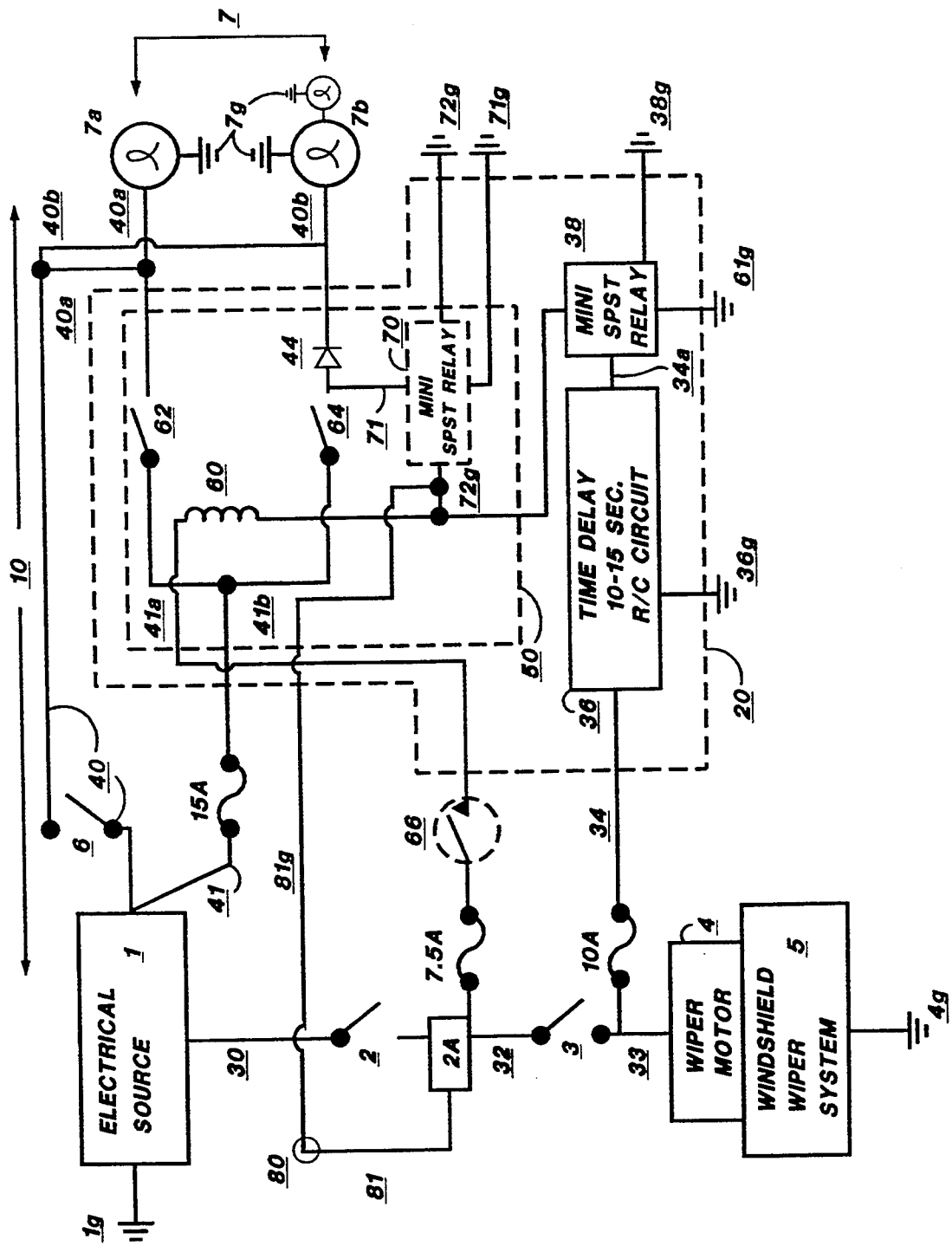

ns system utilizing a timed delay startup and light retention feature

FIELD OF THE INVENTION

The present invention relates to a windshield wiper-activated vehicle lighting system. The present invention is preferably directed to a windshield wiper-activated vehicle lighting system in which the head, tail and parking lights are activated in a time-delay fashion upon activation of the windshield wiper system. The present invention is also directed to a windshield wiper-activated lighting system in which the lighting system is activated in a time-delay fashion upon activation of the windshield wiper system with the ability to retain the lights on following deactivation of the windshield wiper system. The present invention is also directed to a windshield wiper time-delayed activation system having the ability to retain the lights on following deactivation of the windshield wiper system and the ability to manually deactivate vehicle lights when no longer needed illuminated.

DESCRIPTION OF THE PRIOR ART

As a safety precaution, many states now have laws requiring that vehicle lights be turned on, i.e., activated, whenever windshield wipers are necessary for a sustained amount of time during inclement weather conditions such as rain, fog, hail, snow, sleet and mist. Unfortunately, there are many reasons why drivers do not turn on their lights during these conditions. During the daylight hours, many drivers may not think about turning on their lights even when the day is darkened due to inclement weather. Even if the lights are activated during the daytime, drivers often forget to turn them off after the ignition has been turned off. This may result in a dead battery and a car which will not start.

Further, two switches, one for the lights and one for the windshield wipers, are required. Because of this, there is a need for a windshield wiper/vehicle lighting system in which the vehicle head, tail and parking lights automatically activate upon activation of the windshield wipers.

Systems which connect windshield wipers with the vehicle lighting system are known. Reference is made to U.S. Pat. No. 3,600,596 to Aloisantoni, which is directed to a windshield wiper-activated lighting system in which the lights of a vehicle automatically turn on and off when the windshield wipers for the vehicle are activated or deactivated. U.S. Pat. No. 5,170,097 to Montemurro is directed to a system which allows the vehicle driving lights to be operated when the windshield wipers are operating intermittently. Other patents, which describe vehicle windshield wiper/lighting circuits include U.S. Pat. No. 4,985,660 to Cronk, U.S. Pat. No. 5,051,873 to Ruter, U.S. Pat. No. 4,097,839 to Lesiak, U.S. Pat. No. 5,027,001 to Torbert, U.S. Pat. No. 4,956,562 to Benedict et al., U.S. Pat. No. 3,591,845 to Vanderpoel, U.S. Pat. No. 4,656,363 to Carter et al., and U.S. Pat. No. 3,628,085 to Brock.

While all of these patents disclose some means for coordinating the activation of windshield wiper and the vehicle lights, they all suffer from deficiencies. For example, all of the patents disclose a system in which the vehicle lights are immediately activated, i.e., turned on, when the windshield wiper is activated. While the prior art discloses illuminating head, tail and other vehicle lamps with the activation of the windshield wiper system and termination of illumination of the lamps by interrupting voltage flow to the switching device by either turning the windshield wiper system off or turning the vehicle ignition/accessory switch off, the prior art does not disclose or suggest a "time-delay on" feature. Additionally, the prior art discloses deactivation of vehicle lights following deactivation of the windshield wipers; however, the prior art does not disclose retaining the vehicle lights on following deactivation of windshield wiper system.

SUMMARY OF THE INVENTION

An object of this invention is to provide a vehicle lighting system which may be activated whenever the windshield wiper system is activated.

Another object of the present invention is to provide a "time-delay on" feature to windshield wiper/headlight activation systems, which delays the activation of the vehicle lights for a set period of time after the windshield wiper system is activated.

Another object of the present invention is to provide a windshield wiper-induced vehicle light activation system, in which the vehicle lights are automatically turned off when the car ignition system is deactivated or by manual deactivation of vehicle lights following use of windshield wiper system.

These and other objects and features of the invention are provided by the present invention, which is directed to a combination windshield wiper/vehicle lighting activation system in which the activation of the vehicle lights is automatically delayed (hereinafter referred to as "time-delay on") until after the vehicle windshield wipers are activated. The system comprises an electric source connected to the windshield wiper system and the lighting system, wherein the windshield wiper system is connected in series to the lighting system, the windshield wiper further including a windshield wiper on/off switch. Further, a time-delay on device is positioned in series between the windshield wiper on/off switch and the lighting system. The time-delay on device is activated by the windshield wiper on/off selector. The time-delay on device delays the activation of the vehicle lights.

The system is specifically directed to a switching device which senses voltage flow from the windshield wiper on selection. The voltage is sent to a time-delay relay system which energizes a switch designed to turn on the vehicle head, tail and parking lights without requiring physical activation of the standard headlight switch. The time-delay system causes the head and tail lights to be activated a short time, i.e., 10-15 seconds, after the windshield wipers are activated.

Advantageously, the system of the present invention does not interfere with the operation of the vehicle lighting system. The vehicle lights may also be independently activated by an independent light on/off selector switch, which is not controlled by the windshield wiper on/off selector switch or the time-delay system. Further, the system does not affect the normal function of the windshield wiper system when the vehicle headlights are manually activated.

The time-delay on feature of the present invention advantageously creates a system which automatically activates the vehicle head and tail and parking lights, after a short delay period, during rainy-type situations when the windshield wipers must be kept on for extended periods of time. However, because the time-delay on system delays activating the lighting system for a short period of time after the activation of the windshield wiper, the lights will not flash on and off when the windshield wipers are pulsed due to momentary windshield wiper activation or when the windshield wipers are momentarily activated to remove mist from the windshield. Thus, the present invention has advantages in a precipitation situation which does not require continuous operation of the windshield wipers.

Without the time-delay on feature of the present invention, in which the lights are activated as soon as the windshield wiper is activated, the lights would pulse on and off every time the windshield wipers are activated, even for a few seconds. The flashing lights create a potential hazardous distraction to other vehicle operators.

Further objects, features and advantages of the invention will be apparent from the following detailed description when taken in conjunction with the accompanying drawings.

BRIEF DESCRIPTION OF THE DRAWING

FIG. 1 is a circuit diagram of the windshield wiper/vehicle lighting control system for a vehicle having a time-delay on feature via a voltage transfer relay.

DETAILED DESCRIPTION OF THE INVENTION

Referring now to FIG. 1, there is shown a circuit diagram 10 of a combined windshield wiper activation/lighting system for a vehicle such as an automobile, truck, tractor or the like. The windshield wiper assembly 5 is used to clear the windshield of rain, snow and similar matter. The windshield wiper assembly 5 is conventional and by itself does not form the invention. Thus, many of the component features of the windshield wiper assembly 5 are not shown in the circuit diagram 10. The windshield wiper assembly 5 conventionally has a pair a wiper blades (not shown) that are operated by an electric motor 4. The motor 4 is usually activatable only when electric power from an electrical source 1, such as the vehicle battery, reaches the electric motor 4.

The electrical source 1 provides an electric current at a substantially constant voltage. Normally, the electric motor 4 is activated when the vehicle ignition switch 2 and the windshield wiper on/off switch 3 are closed, i.e., activated, causing an electric current to pass through a wire conductor 33 to the windshield wiper motor assembly 5. When the electric motor 4 is activated by an on/off switch 3, the wiper blades sweep across the windshield.

Typically, the electric motor 4 causes the wiper blades to operate in two modes: (1) a continuous sweeping motion which causes the wiper blades to constantly move across the windshield until the motor is switched off; and (2) an intermittent system which causes the windshield wipers to be activated on an intermittent basis. The windshield wiper assembly can be turned off immediately by the deactivation of the on/off switch 3.

Similarly, the vehicle lighting system 7 is known to the art and by itself does not form a part of this invention. For purposes of the present invention, the lighting system 7 will be described with reference to the head lights 7a and the tail and parking lights 7b, although other lights such as the interior car lights, the dash lights, and turn signals may be a part of the vehicle system.

The lighting system 7 is usually directly connected to the electrical source 1 by a conductor 40, which includes a lighting system on/off switch 6. The lighting system 7 is activated by connecting the on/off switch 6 to conductor 40 thereby closing the on/off switch 6 and forming a connection between the electrical source 1 and dual conductors 40a and 40b. The connection allows an electric current to pass to the lighting system 7, causing the head lights 7a and the tail and parking lights 7b to be turned on. The lighting system can be turned off immediately by the deactivation of the on/off switch 6. Each of the windshield wiper system 5, the electrical source 1, the lighting system 7 and a time-delay circuit 36, which will be described below, is provided with a proper common ground 1g, 4g, 7g, 36g, 38g, 61g, 71g, and 72g, respectively.

The present invention is specifically defined by a time-delay on system 20, which delays the electrical connection between the electrical source 1 and the lighting system 7. The time-delay on system 20 is positioned in the vehicle circuitry 10 between the windshield wiper on/off switch 3 and the vehicle lighting system 7. Time-delay systems are known to the art, and by themselves, do not form the invention herein. Reference is made to U.S. Pat. No. 3,628,085 to Brock, for a description of a time-delay system for activating a head lamp control means in a vehicle.

The time-delay system 20 is powered by an electric current passing through conductor 34. The conductor 34 connects the electrical source 1 to the electric current delay system 36.

One example of an electric current delay system 36, which is illustrated in FIG. 1, includes capacitors, resistors, diodes and transistors which together form a resistance-capacitor (RC) timing circuit to delay the activation of the lighting system 7. The electric current passing through the conductor 34 is delayed by the delay RC system 36. The amount of time required for the delay is preprogrammed according to procedures known to art. For example, different capacitors and resistors provide different time delays. The present invention is designed to provide a voltage time delay of 10 to 15 seconds.

Illustrated in FIG. 1, the electric current delay system 36 is followed by a minirelay 38 on the conductor 34a. The purpose of the minirelay 38 is to maintain an open, or broken, circuit until the minirelay is activated thereby closing the circuit. Minirelays are known to the art for opening and closing a circuit. Typical minirelays include a single-pole single-throw (SPST) or single-pole double-throw (SPDT) relay. Preferably, the minirelay 38 of the time-delay circuit is a single-pole single throw (SPST) magnetic relay switch, which provides a minimum of 5 amperes pole outlet and a 10 ampere inlet conduit.

When an electric current passing through conductor 34 is delayed by the electric current delay system 36, no electric current reaches the minirelay 38, and the minirelay 38 remains open. In the present invention, the ground circuit passing through conductor 61g is therefore blocked by the open minirelay 38.

When an electric current finally passes through the electric current delay system 36 comprising the resistors, capacitors, diodes and transistors via the conductors 34 and 34a, an electric current enters and activates the minirelay 38. The minirelay 38 closes the circuit allowing ground connection to pass through the minirelay 38 via conductor 61g. The conductor 61g connects the ground source 61a to electromagnetic relay 50.

The relay 50 includes an electromagnetic coil 60 and armatures, comprised of a double-pole, single-throw (DPST) relay, known to the art. As illustrated in FIG. 1, the present invention preferably has two armatures 62 and 64. In the open position, as illustrated in FIG. 1, the armatures 62, 64 prevent the supply of an electric current from the electrical source 1 to the head lights 7a and tail and parking lights 7b. The lighting system 7 remains deactivated.

Additionally, a conductor 41 leads from the electric source 1 to electric relay 50 creating bifurcated conductors 41a, 41b, which are connected to the armatures 62, 64 respectively. Therefore, the higher amperage necessary to activate the lighting system 7 is being passed through conductor 41 via bifurcated conductors 41a and 41b providing voltage to activate headlamps 7a and tail and parking lamps 7b upon closing armatures 62 and 64.

The armatures 62, 64 are activated by the electromagnetic coil 60, which is energized by the electric current from the electrical source 1 via the conductor 61. The electromagnetic coil 60 is designed to require low amperage drain with continuous operation producing minimal heat build up within the electric coil 60. As illustrated in FIG. 1, 7.5 amperes (7.5 A) of current is sufficient.

The operation of the circuit 10 will be now described. When the auto ignition switch 2 and the windshield wiper on/off switch 3 are closed, electrical power from the electrical source 1 is supplied via the conductors 30, 32 and 33 to the windshield wiper system 4 and 5, thereby activating the windshield wipers. Electric power also passes along the conductor 34 to enter the electric current delay system 36 as described previously. The capacitors, resistors, diodes and transistors form the time-delay circuit 36 to delay passage of electric current to the minirelay 38.

After a programmed delay, the electric current passes through electric current delay system 36 and enters the minirelay 38 causing the minirelay 38 to close its circuit thereby completing a ground circuit through conductor 61g to coil 60. The electric current, then provided to coil 60 via conductor 61, passes to and excites the power relay 50, which causes the electromagnetic coil 60 to close the armatures 62, 64.

Energizing the electric coil 60 closes the armatures 62 and 64 causing electric current to flow from conductors 41a and 41b, creating a circuit allowing voltage from conductor 41 to pass to the lighting system 7. As illustrated in FIG. 1, the system of the present invention can incorporate fifteen amps (15 A) to operate the lighting system 7.

Thus, there are four circuits which play an integral part in the system of the present invention: (1) the circuit which activates the time-delay circuit 36 via conductor 34; (2) the circuit that passes through the time-delay circuit 36 via conductor 34a to the minirelay 38 closing the ground and energizing coil 60; (3) the circuit from the electrical source 1 through the bifurcated conductors 41a and 41b to armatures 62 and 64, via conductors 40a and 40b, activates the lighting system 7; and (4) minirelay 70 acting as a latching relay to retain the lighting system 7 on until purposely deactivated.

An important feature of the present invention relates to turning off the lighting system 7. Essentially, there are three ways the lighting system can be deactivated.

The lighting system 7 can be turned on and off by activating and deactivating, i.e., closing and opening the on/off switch 6. This is a normal feature of vehicles and does not form part of this invention. By using the on/off switch 6, the lighting system 7 can be turned on and off even if the vehicle engine has not been activated by the ignition switch 2.

Alternatively, the lighting system 7, when activated by the windshield wiper system, can be turned off manually by opening the windshield wiper on/off switch 3 and opening the momentary switch 66. It is, within the design of the present invention to provide a delay off feature and to have the lighting system remain on after the windshield wiper on/off switch 3 is opened.

A latching relay 70 is provided to retain voltage flow to the coil 60 thus maintaining a closed position of the armatures 62 and 64 for the purpose of maintaining electric voltage to lighting system 7. Intentional deactivation of the electromagnetic relay 50 may be achieved by momentarily opening the circuit 61 by means of a normally closed switch 66 thus releasing the armatures 62 and 64 to the open position and disrupting voltage flow to headlamps 7a and tail and parking lamps 7b.

Finally, if the lighting system 7 has been turned on by closing the windshield wiper on/off switch 3, while the light on/off switch 6 remains open, the lighting system 7 can be turned off when the vehicle engine is deactivated by opening the ignition switch 2. In this manner, the lighting system 7 will not remain turned on when the vehicle is parked and the ignition switch 2 is opened.

The foregoing is considered as illustrative only of the principles of the invention. Further, since numerous modifications and changes will readily occur to those skilled in the art, it is not desired to limit the invention to the exact construction and operation shown and described. Therefore, all modifications and equivalents that fall within the scope of the claims are embraced by the invention.

I claim:

1. In a vehicle having a windshield wiper system, a lighting system, and an electrical source for activating the windshield wiper system and the lighting system, wherein the windshield wiper system is connected in series to the lighting system and includes a windshield wiper on/off switch, the improvement comprising a system for automatically activating the lighting system when the windshield wiper on/off switch is activated, including a time-delay on device positioned in series between the windshield wiper on/off switch and the lighting system, wherein the time-delay on device is activated by the windshield wiper on/off switch to thereby initiate a time delay which expires upon the earlier of the deactivation of the windshield wiper on/off switch or the expiration of a preset time, and further wherein the lighting system is activated at the expiration of the preset time so that activation and deactivation of the windshield wiper on/off switch during the time delay does not affect the lighting system.

2. The system of claim 1 further providing means for automatically deactivating the lighting system when either the windshield wiper system is deactivated or the electrical source is deactivated.

3. The system of claim 1 further comprising a vehicle light on/off switch for independently activating the lighting system.

4. The system of claim 1 comprising a first electrical circuit for activating a minirelay, a second electrical circuit for connecting an electric current from the electrical source through the activated minirelay to a power relay, and a third electrical circuit for connecting an electric current from the electrical source through the power relay to the lighting system.

5. The system of claim 4 wherein the power relay comprises at least one circuit-connecting armature.

6. The system of claim 5 wherein the power relay comprises an electromagnetic coil for closing the armature when activated by an electric current.

7. The system of claim 6 including a double-pole single-throw (DPST) magnetic relay switch which provides a minimum of 15 amperes per outlet pole and a 30 ampere inlet conduit.

8. The system of claim 6 wherein the power relay comprises a first headlight armature for connecting an electric current to the headlights and a second parking and taillight armature for connecting an electric current to the parking and taillights.

9. The system of claim 1 wherein the electrical source is a vehicle battery.

10. The system of claim 1 wherein the time-delay on device includes a resistance-capacitor (RC) timing circuit.

11. The system of claim 10 wherein the time-delay on device includes a single-pole single-throw (SPST) magnetic relay switch.

12. The system of claim 1 comprising means to deactivate the lighting system, the means including the windshield wiper on/off switch.

13. The system of claim 1 comprising means to deactivate the lighting system when the windshield wiper on/off switch is closed, the means including an ignition switch for connecting the electrical source to the windshield wiper system.

14. The system of claim 1 further comprising means to continue the activation of the lighting system after the windshield wiper system has been manually deactivated.

15. The system of claim 14 further comprising means to manually deactivate the lighting system.

16. In a vehicle having a windshield wiper system, a lighting system, and an electrical source for activating the windshield wiper system and the lighting system, wherein the windshield wiper system is connected in series to the lighting system and includes a windshield wiper on/off switch, the improvement comprising a system for automatically activating the lighting system when the windshield wiper on/off switch is activated including:

a. a time-delay on device positioned in series between the windshield wiper on/off switch and the lighting system, the time-delay on device being activated by the windshield wiper on/off switch to thereby initiate a time delay which expires upon the earlier of the deactivation of the windshield wiper on/off switch and the expiration of a preset time, wherein the lighting system is activated at the expiration of the preset time so that activation and deactivation of the windshield wiper on/off switch during the time delay does not affect the lighting system, b. latching means to continue the activation of the lighting system after the windshield wiper system has been manually deactivated, and c. means to manually deactivate the lighting system.

17. A combination vehicle windshield wiper system and lighting system, wherein the system is activated by an electrical source, comprising:

a. a first circuit which activates a time-delay on device to initiate a time delay which expires upon the earlier of deactivation of the circuit and expiration of a preset time;

b. a second circuit which passes through the time-delay on device to a first minirelay after the expiration of the preset time, wherein the first minirelay activates armatures thereby creating a circuit between the electrical source and the lighting system;

c. a third circuit from the electrical source through the armatures to the lighting system, wherein the third circuit activates the lighting system; and d. a second minirelay which maintains activation of the lighting system until purposely deactivated.

* * * * *